(12) United States Patent
Isson

(10) Patent No.: US 8,699,591 B2
(45) Date of Patent: Apr. 15, 2014

(54) METHOD AND DEVICE FOR REDUCING QUANTIFICATION NOISE FOR TRANSMITTING A MULTI-CARRIER SIGNAL

(75) Inventor: Olivier Isson, Bourg-la-Reine (FR)

(73) Assignee: MSTAR Semiconductor, Inc., Hsinchu Hsien (TW)

( * ) Notice: Subject to any disclaimer, the term of this patent is extended or adjusted under 35 U.S.C. 154(b) by 83 days.

(21) Appl. No.: 13/145,308

(22) PCT Filed: Jan. 8, 2010

(86) PCT No.: PCT/FR2010/000016
§ 371 (c)(1),
(2), (4) Date: Sep. 23, 2011

(87) PCT Pub. No.: WO2010/081960
PCT Pub. Date: Jul. 22, 2010

(65) Prior Publication Data
US 2012/0002747 A1 Jan. 5, 2012

(30) Foreign Application Priority Data
Jan. 19, 2009 (FR) .................................. 09 00231

(51) Int. Cl.
*H04L 27/28* (2006.01)
(52) U.S. Cl.
USPC ........... 375/260; 375/224; 375/267; 375/296; 375/346; 375/349

(58) Field of Classification Search
USPC .................................................. 375/260, 295
See application file for complete search history.

(56) References Cited

U.S. PATENT DOCUMENTS

| 4,926,179 A * | 5/1990 | Yoshioka ...................... 341/144 |
| 5,157,396 A | 10/1992 | Yoshio |
| 2002/0013133 A1* | 1/2002 | Lam .............................. 455/137 |
| 2007/0232246 A1* | 10/2007 | Lozhkin et al. ............... 455/108 |

FOREIGN PATENT DOCUMENTS

| FR | 2 730 590 A1 | 8/1996 |
| GB | 2 298 069 A | 8/1996 |
| WO | WO 03/063160 A1 | 7/2003 |

* cited by examiner

*Primary Examiner* — Dhaval Patel
(74) *Attorney, Agent, or Firm* — WPAT, PC; Justin King

(57) ABSTRACT

A method and apparatus to reduce the level of quantification noise when transmission power varies with frequency. Power variation is carried out in the analog domain by filtering a frequency band and attenuating a complementary band in two signal analog-processing paths. More precisely, the method for reducing the quantification noise for transmitting a multi-carrier signal comprises an IFFT conversion step, a digital-to-analog conversion step and an analog-processing step of the signal frequencies on a band having a maximal frequency. Moreover, the analog processing step includes at least two processing paths in parallel to the analog signal, in which: for at least one first path, the signal is filtered so as to retain only the frequencies of a low-frequency band and, in parallel in at least one second path, the signal is subjected to gain, amplification or gain attenuation and, in a final step, the signals from the paths are summed.

8 Claims, 4 Drawing Sheets

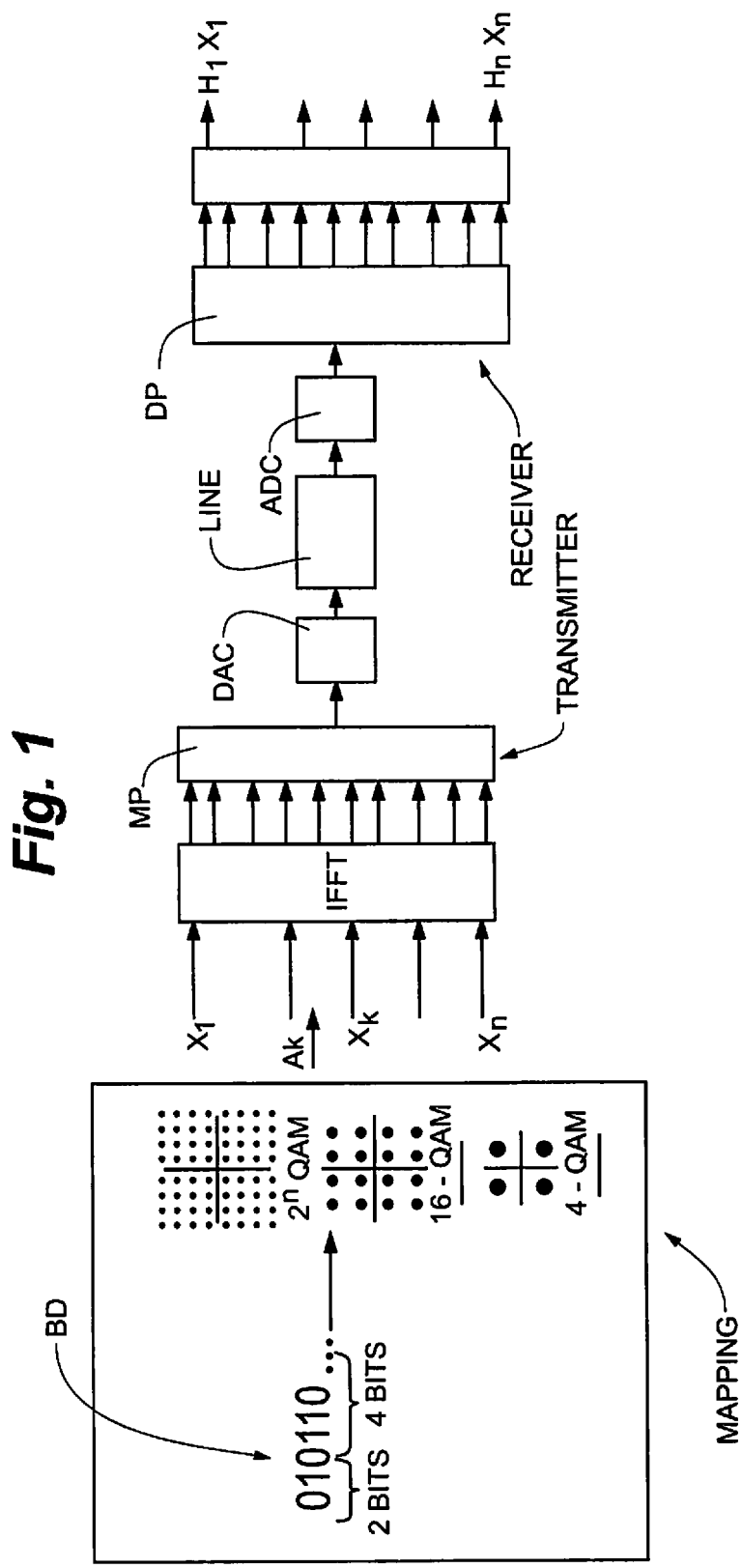

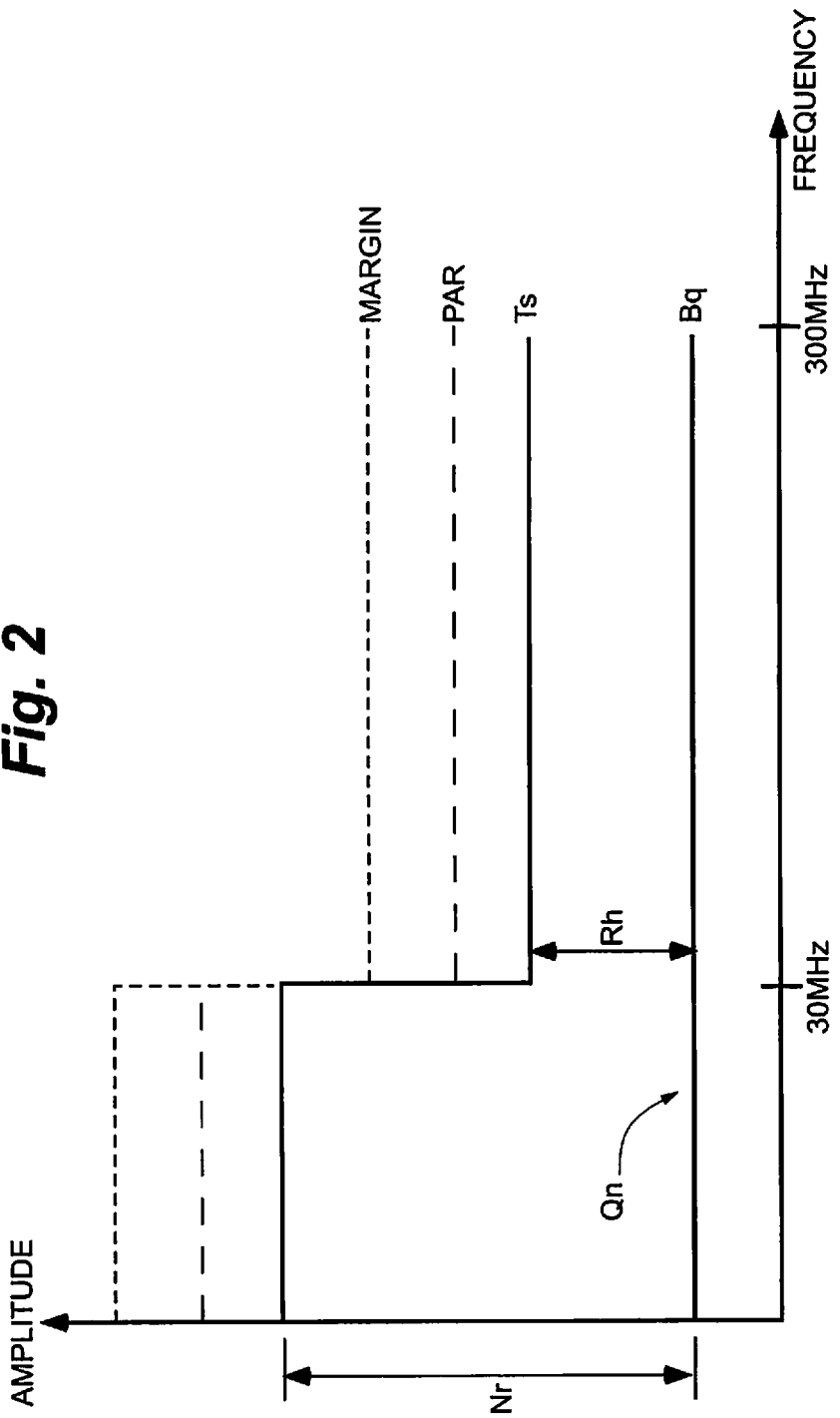

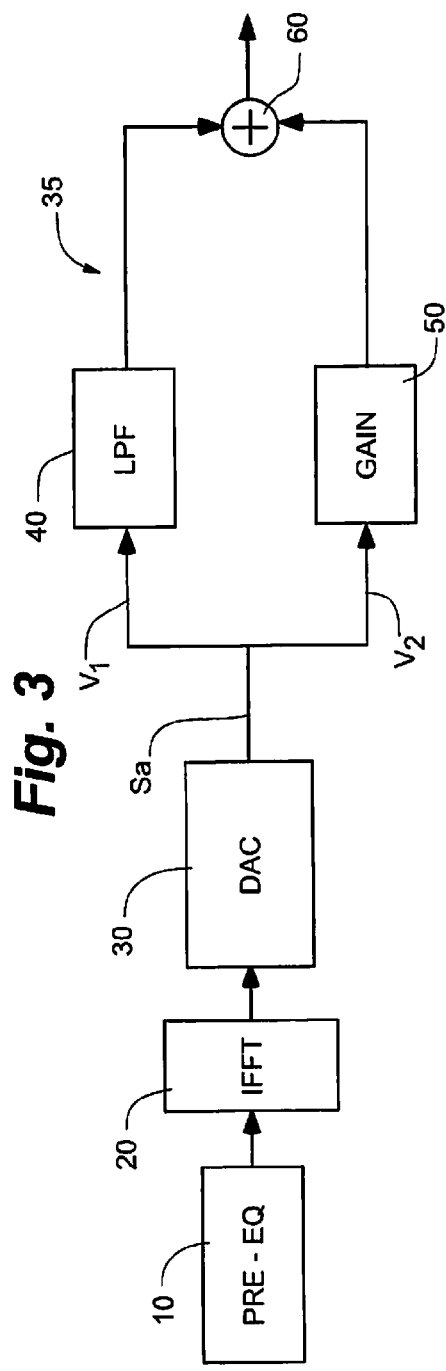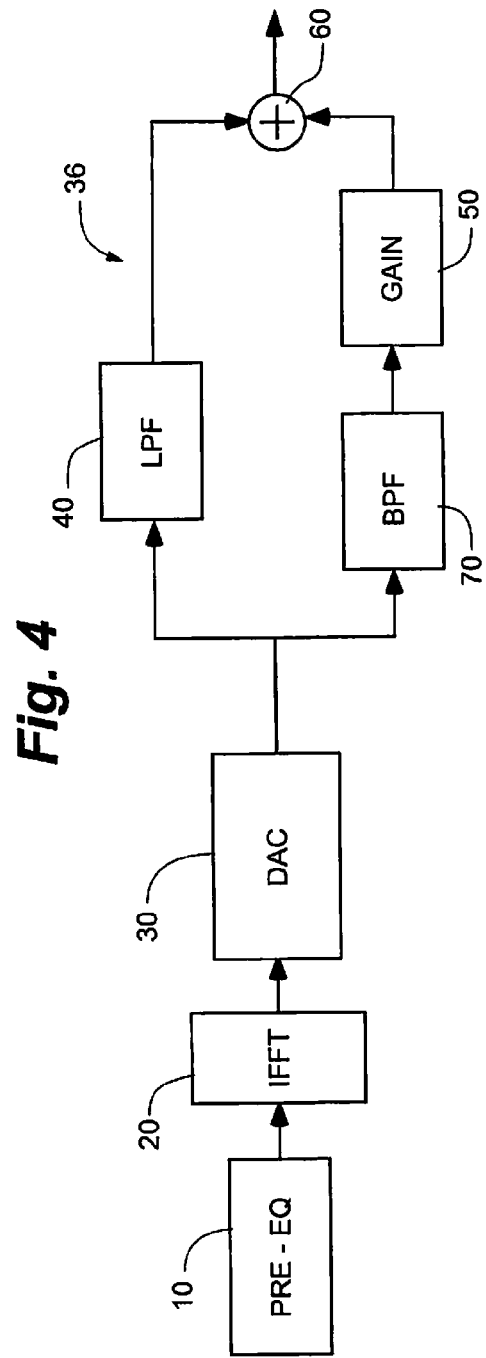

METHOD AND DEVICE FOR REDUCING QUANTIFICATION NOISE FOR TRANSMITTING A MULTI-CARRIER SIGNAL

PRIORITY CLAIM

The present application is a National Phase entry of PCT Application No. PCT/FR2010/000016, filed Jan. 8, 2010, which claims priority from French Application No. 09/00231, filed Jan. 19, 2009, the disclosures of which are hereby incorporated by reference herein in their entirety.

TECHNICAL FIELD OF THE INVENTION

The invention relates to the field of digital communications and more particularly, to the field of noise reduction in digital transmissions.

BACKGROUND ART

The invention is particularly applicable to the domain of multiple sub-carriers (hereinafter: multi-carrier) coded modulation, also known as OFDM (Orthogonal Frequency Division Multiplexing, namely). The basic principle of the OFDM modulation is to split the frequency band into N sub-bands, with N being typically a power of two and each sub-band transmitting data via a sub-carrier.

With reference to FIG. 1, the transmission multi-carrier modulation of a binary data BD first starts with the mapping of groups of bits (2 bits, 4 bits, . . . ) in complex numbers modulated in QAM of $2^n$ bits, so as to obtain the N components $X_1, \ldots X_N$ frequency vector to be transmitted. This vector is then transformed from the frequency domain into time data using a frequency/time converter, for example an IFFT (Inverse Fast Fourier Transforms) and then multiplexed in an multiplexer MP. The data is then converted by a digital-to-analog converter, called D AC converter, sent on the line and received by a sequence of inverse processings—analog-to-digital converter ADC, demultiplexer DP, Fast Fourier Transform IFF—, so as to obtain the N components $H_1X_1, \ldots, H_NX_N$ frequency vector at the reception side.

This technique is used in many telecommunication standards and therefore makes it possible to split the useful band into N independent sub-bands.

An essential step in the digital data transmission is the conversion of digital signals into analog signals. For this purpose, the DAC converter operates at the sampling frequency of the digital signal, using a fixed number of bits for the representation of the input signal.

The input digital signal is then quantified and is thus subjected to truncation. To meet the constraints of the DAC, for example in the case of a 10-bit DAC, the digital signal is represented over exactly 10 bits before being transmitted. This quantification step creates a noise, called quantification noise, which is present from the moment of transmitting the signal. Therefore, this noise may limit the system performances sharply.

In addition, when the transmitted signal has power variations depending on the frequency, then the quantification noise affects the carrier frequencies of the transmitted signal in an SNR ratio (signal-to-noise ratio) different depending on the transmission frequency, which may result in a performance decrease. This effect results from the fact that all the available QAM (Quadrature and Amplitude Modulation) modulations (QPSK Quadrature Phase Shift Keying) to be attributed to the sub-carriers is limited: beyond a certain SNR ratio (for example 30 dB) an SNR loss always leads to a loss of performance, whereas an SNR ratio gain will not lead to a gain of performance when the modulation type offering the maximal rate (example QAM1024) is reached.

However, constraints are usually imposed on the transmission power which should not exceed a certain level. This maximal level may be set by a standard. Such a constraint is particularly present when transmitting on a carrier current, or PLC (Power Line Communication), a constraint imposing a limitation of power spectral density in the band of 0-30 MHz to a power of −50 dBm/Hz and to a power of −80 dBm/Hz in the band of 30-300 MHz.

In the example of this standard, the power of carriers which are higher than 30 MHz should therefore be reduced by 30 dB. To this end, a conventional method illustrated in FIG. 1 consists in pre-multiplying, prior to the application of the inverse transform IFFT, each complex component Xk by a coefficient Ak so as to be able to apply a variable power on the signal to be transmitted. In this example, the Ak coefficients are chosen so as all the carriers corresponding to a frequency higher than 30 MHz are accordingly reduced by 30 dB.

FIG. 2 illustrates the signals amplitude depending on the frequency in the spectral domain. Whatever the power spectral density of the transmitted signal is, quantification noise Qn is flat. Therefore, this quantification noise does not have the same shape as the transmitted effective signal (Es) which varies according to the spectral bands (low band: 0-30 MHz and high band above 30 MHz). As a result, the low band has an average SR signal-to-noise ratio (SNR) much higher than that of the high band. Thus, on the presented example, with a 10-bit converter, the high band has an SNR ratio (Rh) limited to 20 dB, which is unfavorable and strongly limits the throughput, while the Nr ratio of the low band is higher than 40 dB, which is quite acceptable. The limiting signal for the SNR ratio is the effective signal (Es), with the other signals (peak-to-average "PAR" and marginal "Marge"), parallel to the effective signal and significantly higher, have also higher SNR ratios.

A known solution for reducing the quantification noise in the high band (above 30 MHz) is to increase the converter bit number, because the more bits it has the weaker the quantification noise will be. For example, with a 15-bit converter, the SNR ratio of FIG. 2 becomes higher than 40 dB in all bands.

The disadvantage of this solution is the significantly high cost of converters with a large number of input bits.

Another solution is to use two converters, one for each band, which would result in obtaining an acceptable SNR in each band. The disadvantage of this method is also the high cost of converters.

To reduce the quantification noise, also known, from patent document FR 2730590, is a method for feedbacking the signal supplied at the quantification circuit input to reduce the quantification noise. The feedback signal is generated like a filtered difference between a sample of the N bits signal and a time matching sample of a quantified M bits signal, where M is lower than N. The feedback signal is subtracted from the input signal before the quantification, thereby introducing out-of-band noise in the input signal to reduce the band noise in the quantified signal.

This type of noise reducer operates through the adaptation of the signal before the digital-to-analog conversion so as to incorporate the conversion noise. The reducer is not very efficient because the implementation of the feedback signal is not easy.

SUMMARY OF THE INVENTION

Embodiments of the present invention reduce the level of the quantification noise when the transmission power varies along with frequency.

To this end, it is proposed to perform the variation of power in the analog domain by filtering a frequency band and attenuating a complementary band in another signal analog processing path.

More specifically, embodiments of the invention relate to a method for reducing quantification noise for the transmission of a multi-carrier signal, comprising a frequency-time signal transformation step, a digital-analog conversion step and then an analog-processing step of the signal frequencies on a band having a maximal frequency, with the analog processing step including at least two processing paths in parallel to the analog signal, wherein an analog filtering cutting part of the frequency band is applied on at least one path, and in parallel, in at least one second path, the signal is subjected to gain, then in a final step, the signals from the paths are summed.

In particular embodiments:
the gain is negative, the signal undergoing an attenuation, when the signal power is more aligned on that or those of the high band(s) and the gain is positive, the signal being amplified, when the signal power is more aligned with the low band(s).
a preliminary step of signal pre-equalization adapts powers on the carriers so as to compensate at least one further step of analog filtering;
in the at least second path of the analog processing step, the signal is filtered on a high frequency band comprising the frequencies which are higher than the low frequency band filtered in the first step, to the maximal signal frequency;
the band-pass filtering of the at least second path is performed before the attenuation of the signal of the same step.

Embodiments of the invention also relate to a device for reducing quantification noise for the transmission of a multi-carrier signal comprising an IFFT block having an input coupled to receive a digital signal [at the output of the pre-equalizer], a DAC converter having an input coupled to receive the signal at the output of the IFFT block, then at least two paths of an analog processing circuit coupled at the output of the DAC, in which a first processing path comprises an LPF (low-Pass Filter) and a second path comprises a gain attenuator, with the two paths combining in a summer.

According to particular embodiments:
the device comprises a pre-equalizer of the digital signal coupled at the input of the IFFT block;
the at least one second path also comprises a band-pass filter;
the band-pass filter is located prior to the gain attenuator.

BRIEF DESCRIPTION OF THE DRAWINGS

Other characteristics and advantages of the invention will become more apparent upon reading the following detailed description of the exemplary embodiments, with reference to the accompanying drawings which illustrate, respectively:

FIG. 1, a block diagram of the OFDM (already commented);

FIG. 2, a graph of signals amplitude and quantification noise variation in accordance with the transmitted frequency bands (already commented)

FIG. 3, a non exhaustive example of a two-path device for reducing quantification noise according to the invention, FIG. 4, an embodiment according to FIG. 3 equipped with a band-pass filter;

For reasons of clarity, the identical or similar elements have been marked by identical references on all figures.

DETAILED DESCRIPTION

Figure 5:
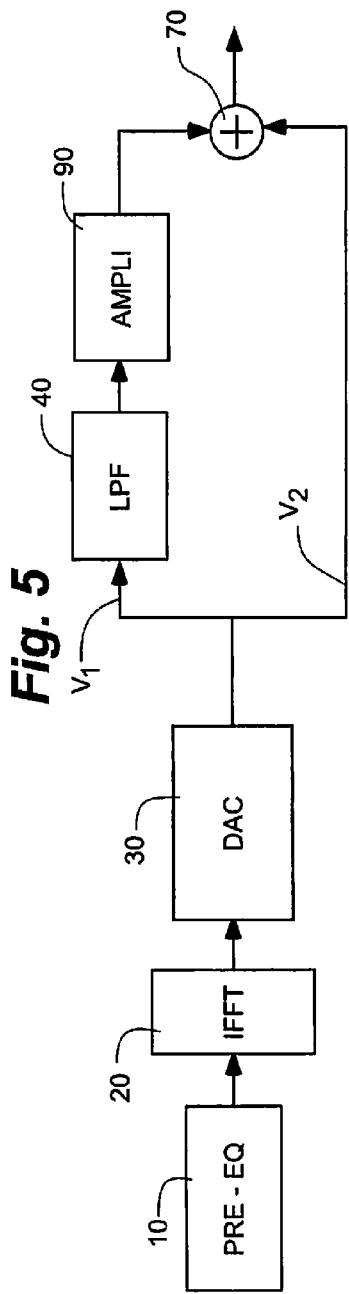
FIG. 5, an example of an embodiment of a device with amplification on one of the processing paths.

In a first embodiment according to FIG. 3, a Pre-equalizer 10 of the signal S is coupled at the input of an IFFT block 20, itself coupled to a DAC converter 30.

The Pre-equalizer 10 linearly modulates the complex components of the sub-carriers of the signal S to apply on them variable powers. The modulation is calculated so as this pre-setting compensates in advance the effects of further analog filtering by varying the powers on the carriers.

The IFFT then transforms the signal of the frequency domain to the time domain to allow its conversion into an analog signal by sampling in the DAC 30. In the example, the converter 30 operates at a frequency of 200 MHz for a frequency band to be processed ranging between 0 and 100 MHz. Generally, a DAC converter operates at a frequency equal to twice the maximal frequency of the band to be processed.

At the output of the converter 30, the analog signal (As) is transmitted in an analog processing circuit 35 which comprises two parallel paths V1 and V2. The first path V1 causes the signal (As) to traverse a low-pass filter LPF 40 at a cutoff frequency of 30 MHz, in order to keep intact the low-frequency band 0-30 MHz, called low band, deriving from the converter 30, and to strongly attenuate the frequencies which are higher than this cutoff frequency.

The at least one second path V2 requires an attenuation by –30 dB to the entire signal (As), by a signal gain on this path through an amplifier 50.

These two paths are combined using a path summer 60 providing, then, at the output, a signal (As) attenuated by 30 dB on the high frequency band 30-100 MHz (known as high band), and not attenuated on the band 0-30 MHz because of the processings of filtering and attenuation on respectively V1 and V2 paths, while presenting an acceptable SNR ratio for the whole band as illustrated below with reference to FIG. 5.

The pre-equalizer 10 prefixes a power template on the low frequency band so as the attenuation by 30 dB on this band is made up for by this template in the V2 path and that the signal, once summed, remains the same in the low band 0-30 MHz.

An embodiment is illustrated as a reference in FIG. 4. The signal limited to the 0-100 MHz band is transmitted, in the same manner as in the previous example, by passing in the signal carrier power adaptation pre-equalizer 10, the IFFT transformer 20 and the DAC converter 30 at 200 MHz.

The signal at the output of the converter 30 is then transmitted in the two-path analog processing circuit 36. The first path V1 remains identical and makes the signal pass in the LPF 40 filter at the cutoff frequency of 30 MHz.

The second path V2 makes the signal pass in a band-pass filter BPF 70 to select the high band 30-100 MHz in this path. The amplifier 50 then applies a gain of –30 dB to this high frequency band. The two bands are then summed by the summer 60 and the gain of the signal at the output is identical for the low band 0-30 MHz and attenuated by 30 dB for the high band 30-100 MHz, while ensuring a good SNR on the whole band.

The introduction of a high band-pass filter on the V2 path and the presence of a low pass filter on the V1 path has the advantage of splitting bands on the paths and applying attenuation by 30 dB only exclusively on the high band 30-100 MHz.

To ensure an accurate summing at the output of the two paths, the pre-equalizer anticipates the weakening of the signal around the cutoff frequency of filters 40 and 70 by increasing the carrier frequency around 30 MHz.

In another embodiment, illustrated in FIG. 5, the low band signal is filtered by the LPF 40 on the V1 path then, on the same path, amplified by the application of an amplifier 90, while the high band signal does not undergo any change and is transmitted by the V2 path. This embodiment is advantageously adopted when the signal at the DAC 30 output is substantially aligned with the power of the low band.

Figure 6:
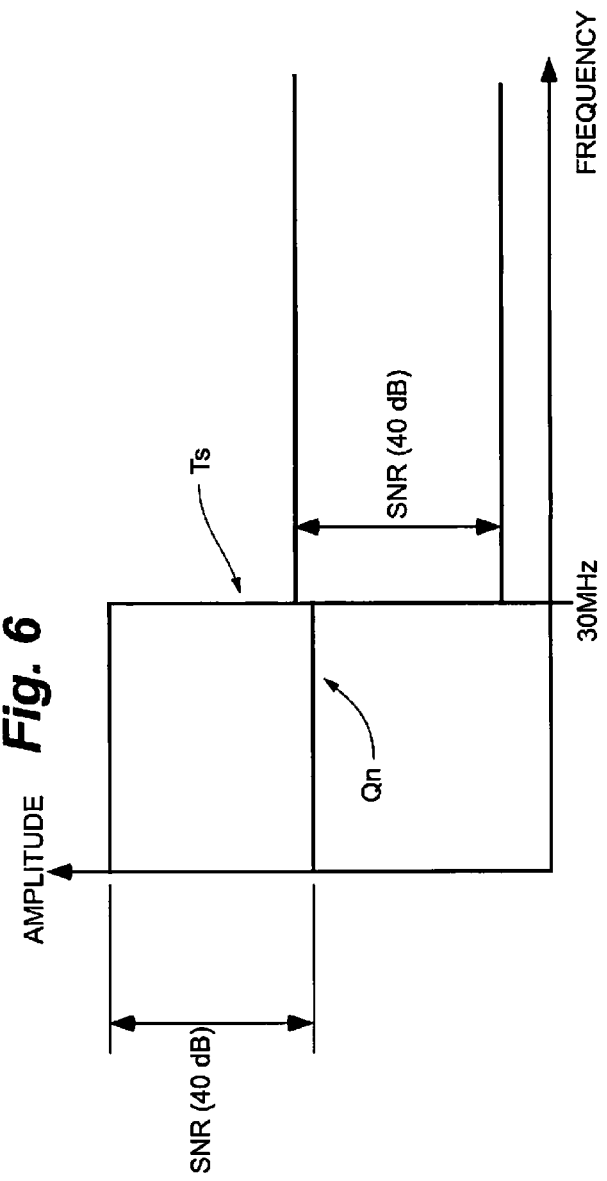
FIG. 6, the diagram according to FIG. 2 obtained within the scope of embodiments of the invention.

The signal resulting from the total of the two paths is illustrated in FIG. 6. The obtained SNR is constant over the whole band because the transmitted signal (Ts), just like the quantification noise Qn, has been filtered, then appears attenuated on the band above 30 MHz.

FIG. 6 illustrates more precisely the charts of the effective signal (Es) and of the quantification noise (Qn) obtained depending on the frequency for the previous arrangements. It appears that the analog processing circuits 35 and 36, as illustrated in FIGS. 3 to 5, in the case of a converter with an effective number of bits close to 10, allow the quantification noise Qn to have a profile parallel to the effective signal (Es), respectively in the low band 0-30 MHz and in the high band 30-100 MHz. It follows that the SNR remains constant over the whole band 0-100 MHz, and that the SNR is about 40 dB, a quite acceptable level, with the required limitation on each frequency band.

The invention is not limited to the exemplary embodiments described and shown. For example, it is possible to split the bands in more than two bands, to apply an amplification (positive gain) instead of an attenuation, to filter using filters that cut a part that can be separated from the band, to use more than two paths some of which specific to filtering, while the others specific to the application of gain, or to use any means equivalent to the described means without departing from the scope of the invention.

What is claimed is:

1. A method for reducing quantification noise from transmitting a multi-carrier signal, comprising:
    a frequency-time signal transformation step;
    a Digital-to-Analog conversion (DAC) step producing an analog signal;
    an analog processing step for receiving and processing the analog signal comprising:
        a first path, including an analog filtering to cut a part of a frequency band of the analog signal to generate a first signal; and
        a second path, including a gain to apply to the analog signal to generate signal, wherein the second path is in parallel with the first path; and
    a path summation step, for combining the first signal and the second signal.

2. The method for reducing quantification noise according to claim 1, wherein a preliminary step of signal pre-equalization adapts variable powers on a plurality of sub-carriers so as to offset at least a further step of analog filtering.

3. The method for reducing quantification noise from transmitting a multi-carrier signal according to claim 2, wherein in the second path of the analog processing step, the analog signal is filtered on a high frequency band comprising frequencies which are higher than frequencies of a low frequency band filtered in the first path.

4. The method for reducing quantification noise according to claim 3, wherein a band-pass filtering of the second path is carried out before an attenuation of the gain of the same path.

5. A device for reducing quantification noise from transmitting a multi-carrier signal, comprising
    an inverse fast Fourier transform (IFFT) block having an input coupled to receive a digital signal;
    a DAC converter having an input coupled to receive the digital signal at the output of the IFFT block;
    an analog processing circuit comprising:
        a first path comprising a low pass filter; and
        a second path comprising an attenuator gain amplifier;
            wherein the first and second paths are parallel to each other and coupled at the output of the DAC converter;
    a summer, in which the first and second paths are combined.

6. The device for reducing quantification noise according to claim 5, wherein a pre-equalizer of the digital signal is coupled at an input of the IFFT block.

7. The device for reducing quantification noise according to claim 5, wherein the second path also comprises a band-pass filter.

8. The device for reducing quantification noise according to claim 7, wherein the band-pass filter is located prior to the attenuator gain amplifier.

* * * * *